United States Patent
Venter et al.

(10) Patent No.: US 10,151,249 B2
(45) Date of Patent: Dec. 11, 2018

(54) GAS TURBINE ARCHITECTURE

(71) Applicants: ROLLS-ROYCE PLC, London (GB); ROLLS-ROYCE DEUTSCHLAND LTD & CO KG, Dahlewitz (DE)

(72) Inventors: Gideon Daniel Venter, Berlin (DE); Michael John Mountney, Derby (GB)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 358 days.

(21) Appl. No.: 14/866,113

(22) Filed: Sep. 25, 2015

(65) Prior Publication Data
US 2016/0097331 A1    Apr. 7, 2016

(30) Foreign Application Priority Data
Oct. 3, 2014   (GB) .................................. 1417505.3

(51) Int. Cl.
*F02C 7/36*     (2006.01)
*F16H 1/48*     (2006.01)
(Continued)

(52) U.S. Cl.
CPC ............... *F02C 7/36* (2013.01); *F01D 15/12* (2013.01); *F01D 25/04* (2013.01); *F01D 25/164* (2013.01); *F02C 7/06* (2013.01); *F02K 3/04* (2013.01); *F16C 19/26* (2013.01); *F16C 27/045* (2013.01); *F16H 1/48* (2013.01); *F16H 57/0006* (2013.01); *F05D 2260/40311* (2013.01); *F05D 2260/96* (2013.01); *F16C 2360/23* (2013.01)

(58) Field of Classification Search
CPC ........ F02C 7/36; F01D 25/162; F01D 25/164; F01D 25/04; F16C 27/045; F16H 1/48; F05D 2260/40311
See application file for complete search history.

(56) References Cited

U.S. PATENT DOCUMENTS 2,968,922 A    1/1961 Gilbert
4,271,928 A    6/1981 Northern
(Continued)

FOREIGN PATENT DOCUMENTS

EP    2327859 A2    6/2011
EP    2518279 A2    10/2012
(Continued)

OTHER PUBLICATIONS

Apr. 1, 2015 Search Report issued in British Patent Application No. GB1417504.6.
(Continued)

*Primary Examiner* — Logan Kraft
*Assistant Examiner* — Elton Wong
(74) *Attorney, Agent, or Firm* — Oliff PLC

(57) ABSTRACT

A geared architecture for a gas turbine comprising an output shaft for connection with a fan, an input shaft and a gearbox connecting the input shaft with the output shaft. The gearbox has a forward planet carrier plate supported by a forward radially fixed bearing structure and a rearward planet carrier plate supported by a rearward radially fixed bearing structure. By supporting the carrier plates on radially fixed bearing structures the planet carriers can rotate about their own axis to lower vibration and mesh forces within the gearbox.

16 Claims, 3 Drawing Sheets

(51) Int. Cl.
*F16H 57/00* (2012.01)
*F16C 27/04* (2006.01)
*F02C 7/06* (2006.01)
*F01D 15/12* (2006.01)
*F01D 25/04* (2006.01)
*F02K 3/04* (2006.01)
*F01D 25/16* (2006.01)
*F16C 19/26* (2006.01)

(56) References Cited

U.S. PATENT DOCUMENTS

| | | |
|---|---|---|
| 5,433,674 A | 7/1995 | Sheridan et al. |
| 5,466,198 A | 11/1995 | McKibbin et al. |
| 8,297,916 B1 | 10/2012 | McCune et al. |
| 2010/0150702 A1 | 6/2010 | Sheridan et al. |
| 2011/0130246 A1* | 6/2011 | McCune ............... F01D 25/164 |
| | | 477/115 |
| 2012/0192570 A1 | 8/2012 | McCune et al. |
| 2014/0155213 A1* | 6/2014 | Sheridan .................. F02C 7/36 |
| | | 475/159 |
| 2014/0193245 A1* | 7/2014 | Morreale .............. F01D 25/164 |
| | | 415/170.1 |
| 2016/0076393 A1* | 3/2016 | Sheridan ............... F16H 1/2809 |
| | | 416/170 R |

FOREIGN PATENT DOCUMENTS

| | | |
|---|---|---|
| GB | 1 363 151 A | 8/1974 |
| WO | 2014182467 A1 | 11/2014 |

OTHER PUBLICATIONS

Mar. 30, 2015 Search Report issued in British Patent Application No. GB1417505.3.
U.S. Appl. No. 14/865,838, filed Sep. 25, 2015 in the name of Gideon Daniel Venter.
Feb. 17, 2016 Search Report issued in European Patent Application No. 15 18 6894.
Feb. 17, 2016 Search Report issued in European Patent Application No. 15 18 6893.
Oct. 19, 2017 Office Action issued in U.S. Appl. No. 14/865,838.
Apr. 16, 2018 Office Action issued in U.S. Appl. No. 14/865,838.

* cited by examiner

GAS TURBINE ARCHITECTURE

The present invention relates to a gearing architecture particularly for a gas turbine engine and particularly for a gearing architecture between a compressor and a fan stage in a gas turbine engine.

In recent years there has been an increased focus on fuel efficiency in the aerospace industry that has led to the provision of turbofan engines with low pressure fans of increased size and greater bypass ratios.

The fan of a gas turbine engine is driven by a shaft from the turbine. The efficiency of the fan depends on its rotational velocity and in order to operate efficiently the fan must rotate at a rotational velocity that is within a given range. To achieve the required rotational velocity the turbine is split into high, intermediate and low pressure sections with the high pressure turbine driving the high pressure compressor, the intermediate pressure turbine driving the intermediate compressor and the low pressure turbine driving the fan. Each section of the turbine is configured to rotate at a suitable rotational velocity. Shafts connect the respective turbine and compressor components. In this way the rotational velocity of the fan can be matched to the rotational velocity of the low pressure turbine and this rotational velocity can be different to the rotational velocity (and direction of rotation) of the other turbine or compressor components.

In a geared fan arrangement a reduction gearbox is provided to reduce the speed from the low pressure turbine to the fan. The use of a reduction gearbox allows both the fan and the low pressure turbine to operate at optimal speeds resulting in minimum fan noise and optimum low pressure turbine efficiency. This enables the use of a smaller low pressure turbine that reduces engine weight, length and radial engine size since the same work is done with fewer and smaller turbine stages compared to a low pressure turbine that is coupled directly to the fan.

The reduction gearbox has an input shaft that is coupled to the low pressure turbine shaft through a splined joint from the intermediate pressure compressor and an output shaft leading to the fan. Significant forces are transferred through the gearbox and any misalignments between the many parts of the gearbox, or the input or output shafts can lead to increased wear and/or damage to the gearbox. Such misalignments could be caused, for example by manufacturing non-conformance, gyroscopic loads during engine operation or assembly misalignments.

It is an object of the present invention to seek to provide an improved gearing architecture for a gas turbine engine that seeks to address this, and other problems.

According to a first aspect of the invention there is provided a geared architecture for a gas turbine, comprising: an output shaft for connection with a fan; an input shaft; a gearbox connecting the input shaft with the output shaft, the gearbox having a forward carrier supported by a forward radially fixed bearing structure; and a rearward carrier supported by a rearward radially fixed bearing structure; wherein at least one of the bearing structures comprise a squeeze film damper.

By supporting the carriers on radially fixed bearing structures the carriers can rotate about their own axis to lower vibration and mesh forces within the gearbox. This accurate rotation about an axis can limit a number of technical issues such as: significant vibration, excessive structural loads, excessive bearing loads, excessive gear mesh loads and increased leakage at oil transfer couplings.

The squeeze film dampers help to absorb vibrational energy and serve to help to isolate the carriers from engine structure vibrations and also the engine structure from vibrations induced by carrier unbalance loads. The support arrangement can also prevent displacement caused by gyroscopic loads ensuring that no additional loads are transferred to the gears and bearings allowing an optimised gearbox design.

The bearings in the fixed bearing structure may be roller bearings that may be mounted in an annular race. The bearing structure may be part of the fan bearing support structure. Other bearing arrangements may be used as appropriate.

The squeeze film dampers may be located between a gearbox support arm and the radially outer bearing race and may comprise a cavity filled with lubricant. The cavity may be connected with a conduit in the support arm and bounded at axially spaced locations by seals permitting a controlled leakage of lubricant.

Preferably the gearbox is an epicyclic gearbox having a central sun gear and a plurality of planet gears adapted to orbit the sun gear.

The central sun gear may be driven by the input shaft that connects between a gas turbine intermediate pressure compressor and the gear box. A portion of the input shaft may also be supported by part of the rearward radially fixed bearing structure.

The planet gears may be connected to the forward carrier.

The forward planet carrier plate may comprise a plurality of planet pins extending into the gearbox, each planet pin supporting a planet gear.

There may be three to nine and preferably five planet gears.

Each planet gear may be supported on a respective planet pin by a spherical or ball joint permitting relative movement of the planet pin and planet gear.

The spherical joint can compensate for slight pitch changes of the carrier plate or deflection of the planet pins and assist in the continuing alignment of the planet gears with the sun and ring gears to limit the load and wear that could be caused by the meshed gearing. The spherical joint may be located midway along the axial length of the planet gear to assist in minimising torsional wind-up or moments around the joint.

The forward carrier may also comprise a forward extending flange, the flange having a radially outer surface supported by the forward fixed bearing structure.

A squeeze film damper may be located on a radially outer edge of the forward carrier plate. A squeeze film damper may be located against a radially outer surface of a projection extending axially rearward from the rearward carrier plate. A squeeze film damper may be located on a radially outer edge of the rearward carrier plate. Squeeze film dampers may be located both on the radially outer edge of the forward carrier plate and the radially outer edge of the rearward carrier plate. Squeeze film dampers may be located both on the radially outer edge of the forward carrier plate and the radially outer surface of a projection extending axially rearward from the rearward carrier plate. Squeeze film dampers may be located both on the radially outer edge of the rearward carrier plate and the radially outer surface of a projection extending axially rearward from the rearward carrier plate. Squeeze film dampers may be located on the radially outer edge of the rearward carrier plate, the radially outer edge of the forward carrier and the radially outer surface of a projection extending axially rearward from the rearward carrier.

The rearward radially fixed bearing structure may have a lubricant transfer coupling for the supply of lubricant to the gear box.

The lubricant transfer coupling is located close to the gearbox to help reduce leakage and loss from the lubricant system. This reduces the overall amount of lubricant required and the required capacity of the pumps and tanks associated with the lubricant system. The smaller sizes of the components helps lower the weight of the system.

The lubricant transfer coupling may further comprise a passage from an oil sump.

The rearward carrier plate may have an internal passage for the supply of lubricant from the lubricant transfer coupling to the gear box.

The carrier plate may have a radial portion and a cylindrical projection that extends axially rearward from the flange. The internal passage may extend within both the radial portion and the cylindrical projection. Within the cylindrical projection the passage may be annular. Within the radial portion the passage may be a single circular cavity or may be provided by a plurality of radial passages projecting from the passage in the cylindrical portion.

The internal passage may have an inlet adjacent the lubricant transfer coupling and one or more outlets adjacent one or more gears in the gearbox. The outlets can supply lubricant to the sun gear, the planet gears and/or a radially outer ring gear.

The inlet may be located in the cylindrical projection. The one or more outlets may be provided in the radial portion.

Where the gearbox comprises a radially outer ring gear, the gear may be flexibly mounted to a fixed structure. The ring gear may comprise two axially spaced gear regions of opposite hand separated by a non-geared region. Each gear region may be separately mounted to the fixed structure by respective flexible mounts.

The ring gear may be static or rotating and the where a rotating ring gear is used the forward plate may rotate at the same speed as the ring gear.

The separate flexible mounts may attach to the fixed structure at a common location point.

A first one of the flexible mounts may extend axially forward from the common location point to a respective gear region and a second one of the flexible mounts extends axially rearward from the common location point to a respective gear region.

A flexible coupling may be provided between the output shaft and the forward carrier plate.

The flexible coupling further helps to isolate the gearbox from external loads induced by misalignment or by transient loads experienced during flight manoeuvres or by foreign object impact.

Isolating the gearbox from external loads allows the gearbox components that would otherwise have to be designed to cope with higher loads to be made smaller resulting in a decrease in the gearbox size and weight. Weight also affects engine vibrational behaviour and the measures required to counter the effects especially in cases like fan blade off and windmilling post fan blade off. A larger gearbox will also limit the space available for the fan support structure, bearings and fan blade off fusing features where a minimum axial distance is required to ensure adequate bearing span.

The flexible coupling may comprise a hollow annular connector between a fan shaft and the forward extending flange, the annular connector having a radially outwardly extending first wall joined to the fan shaft, a radially outwardly extending second wall joined to the forward flange and a curved radially outer periphery joining the first and second walls.

The flexible coupling may be provided by a composite material made by a laminate of plies of e.g. a glass, aramid or carbon fibre embedded within a resin such as an epoxy or other appropriate material. Alternatively, the flexible coupling may be metallic or another appropriate material.

The flexible coupling may be torsionally stiff but axially compliant. Torsional deflection will result in gear tooth and bearing misalignment causing local overloads. To counter this gear tooth profiles and bearing rolling elements need to be modified to improve the loading characteristics. The modification will be applied for a specific load condition where the components are expected to operate for the bulk of the time. This will result in a compromise for other load settings. Gear tooth and rolling element modification however reduces the effective contact areas requiring a further increase in size to compensate, or additional tooth and bearing correction The exact form of the flexible couplings is subject to finite element modelling analysis and can either be a flow formed single or welded component or loose parts that are bolted together. Through design optimum space utilisation with functionality to suit the available space and operational conditions is possible.

An embodiment will now be described by way of example only and by reference to the accompanying drawings, in which.

Figure 1:
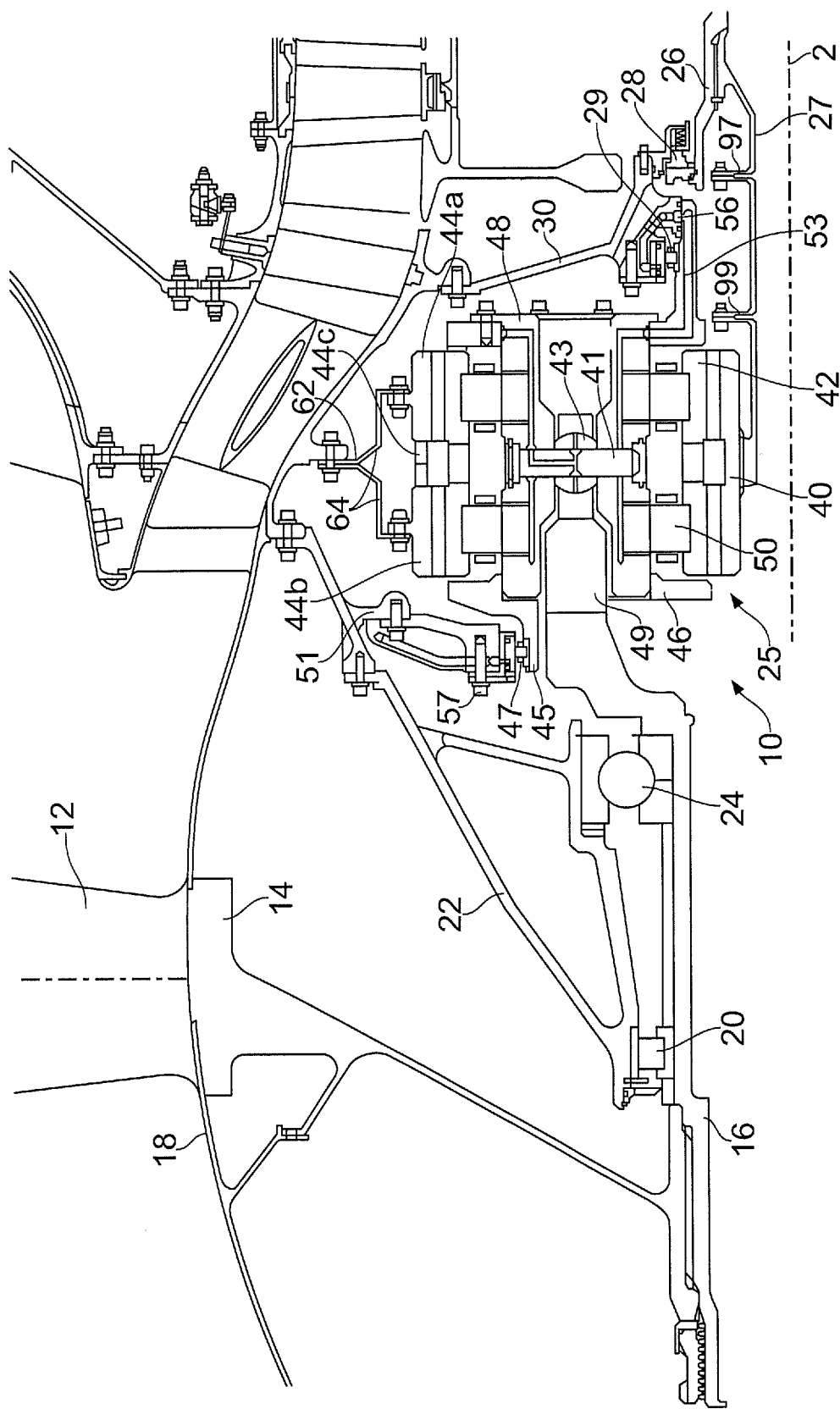
FIG. 1 depicts a cross section through the front end of a gas turbine engine having a gear architecture 10 in accordance with the present invention for use in a gas turbine engine.

FIG. 1 depicts a cross section through the front end of a gas turbine engine having a gear architecture 10 in accordance with the present invention for use in a gas turbine engine. The gas turbine engine has a fan stage that has a circumferential array of fan blades 12 mounted to a fan disc 14. The blades and disc rotate around the engine axis 2. A plurality of axially extending slots are machined into the radially outer surface of the fan disc and these are shaped to receive a correspondingly shaped feature that is provided on the root of the fan blade. Alternatively the fan blades may be integrally formed with the disc hub.

An annulus filler and fan fairing 18 provides a smooth surface over which the air passes as it approaches the fan stage and is pushed rearwards by the fan. The fan fairing is mounted to and supported by the fan disc.

The disc is mounted on a fan shaft 16 that is a cylindrical component extending about the engine axis 2. The disc and shaft together support all the rotating components forward of the gearbox and can experience bending moments from the fan either in normal flight operation as the engine undergoes acceleration or manoeuvre, or in extremely rare failure conditions such as when the a blade is hit by foreign objects that cause the release or deformation of one or more of the blades.

The fan shaft has a support mechanism that includes a forward bearing 20 that supports the fan shaft in its radial position through a support arm 22. A location bearing 24 serves to limit the axial movement of the fan shaft within the engine. The fan shaft is connected to the output side of the gearbox 25.

The gearbox input shaft 26 connects between the turbine and the gearbox 25. The shaft is supported by a bearing arrangement 29 that serves to locate the shaft radially within the engine with a support structure 30 that extends through to the engine casing. A seal 28 is provided between the rotating shaft and static support 30. The input shaft can have slight eccentricity from the engine axis 2 caused by engine deformation and/or misalignment.

The fan reduction gearbox 25 can be either a simple star or planetary epicyclic arrangement using double helical gears to ensure highest power to weight ratio. The reduction ratio will determine the max number of planets that can be fitted circumferentially. In the embodiment shown the gearbox 25 is a planetary epicyclic gearbox having a central sun gear 40, planet gears 42 that orbit the sun gear and a ring gear 44. The torque or forward planet carrier has a series of pins or drive arms 49 that engage the planet gears such that the planet carrier rotates around the engine axis at the same speed that the planet gears orbit the sun gear.

The forward carrier 46 has a forwardly extending flange 45 that is supported by a support bearing 47 carried by a structure 51 that transmits loads to the engine casing. The bearing is at a fixed axial and radial location relative to the engine axis 2 and inhibits radial translation of the flange.

An oil transfer feed is located close to the front roller bearing 47. This positioning keeps the radial clearance and shaft run out relative to the bearing support structure 51 at a minimum to reduce oil leakage and improve sealing reliability since the bearing has limited radial clearance.

The bearings may be roller bearings mounted in an annular bearing race. Other bearings as deemed appropriate may be used.

The rear carrier plate 48 and front carrier 46 supports the planet bearings 50. The rear carrier plate has extensions that protrude between the respective planet gears and are attached to the forward carrier single plate with free standing pins. The rear carrier also has an axially rearwardly extending cylinder 53 that is supported by bearings 29 carried by input shaft support structure 30. The rear carrier provides radial support for the rear roller bearing as well as offering an oil supply circuit and feed passages to supply oil for lubrication to the planet bearings, gear mesh, sun gear spline and fan shaft bearing. The rear support structure 30 serves to locate the rear carrier at a fixed axial and radial position relative to the engine axis 2.

The bearings may be roller bearings mounted in an annular bearing race. Other bearings as deemed appropriate may be used.

Supporting the gearbox carriers on bearings that are mounted at a fixed radial location and optionally permitting at least some of the other gear components such as the ring 44 and sun gear 40 to be more flexibly mounted such that they can move relative to the carrier aids the ability of the planet carrier to rotate around its own axis to ensure lower vibration.

An oil transfer coupling 56 is located close to the rear roller bearing 29. This positioning keeps the radial clearance and shaft run out relative to the bearing support structure at a minimum to reduce oil leakage and improve sealing reliability since the roller bearing has limited radial clearance.

The oil transfer coupling 56 supplies lubricant to the cylindrical portion of the rear carrier plate that has an internal annular passage that extends axially forward to the radial plate and then turns to extend radially either as a single circular passageway or as a series of spokes. The inlet to the annular passage may be a continuous passage extending around the periphery of the cylindrical portion or the inlet may be a series of circumferentially spaced apertures.

The location of an oil transfer coupling in close proximity to one or more of the bearings helps in that it provides good centring for the oil transfer coupling with minimal leakage.

Such a rear carrier plate with its complex internal passages can be difficult to manufacture and it has been found that it is possible to manufacture it by a method that involves additive layers, amongst other methods e.g. milling and welding. Many different types of additive layer manufacture are available and can be selected for use depending on, for example, the material used or size of the gear arrangement. In one method of additive layer manufacture the component is formed in a powder bed, where a layer of metallic powder is formed on a platen, a laser is traversed over the layer to melt the desired shape, the platen is indexed, a new layer is applied and the steps repeated till the article is complete. In a further method of additive layer manufacture a powder is blown into a melt pool formed by a traversing laser, the powder melting and cooling to form a deposit with a height. Subsequent melt pools are formed in the solidified deposit to raise the height of the deposit. In a further method of additive layer manufacture a wire is melted to form a deposit onto which further layers of the melted wire are formed. Other forms of additive layer manufacture are known and may be used where appropriate.

In order to increase the power density and to avoid axial loads reacting on the gearbox, double helical ring gears 44*a*, 44*b* are used. The ring gear is produced in two halves to permit assembly to the planet gears. The axial force applied on the ring gear halves resulting from the gear mesh are a result of the helix angle as well as the hand of helix. These are selected to direct the direct the axial force towards the other ring gear half. There is a non toothed section 44*c* between the ring gear halves that has cutouts or apertures that enable oil drainage from the gear mesh area. The position of these holes allow oil that is ejected through the upper part of the gearbox to collect in a gutter and drained to the oil collection point from where it will be scavenged away rather than draining back into the gearbox.

The two ring gear halves each feature an axially centred attachment flange 62 to help avoid torsional wind up. Each ring gear half is attached to the engine structure by separate flexible diaphragm supports 64. It is desirable that the diaphragm supports are symmetrical to each other and mounted to the engine structure at a common position to minimise torsional wind up or unequal moments across the width of the gear. The flexible supports allow independent radial displacement of the respective ring gear halves to ensure optimal meshing conditions and to counter manufacturing variations. The flexible supports are axially compliant and are not required to keep the two ring gear halves together, the axial movement being limited by the gear angle and gear hand of the double helix ring gear.

The flexible supports can feature circumferential drainage holes to drain the oil completely away from the gearbox and together can define a channel to direct the oil towards an oil sump.

The rotating carrier assembly with the planet gears and bearings is a large rotating mass consisting of numerous parts. Although the parts are matched by weight to ensure the minimum unbalance there will inevitably be an undesirable weight scatter tolerance. There may also be rotational unbalance of the individual planet bearings and gears.

Figure 2:
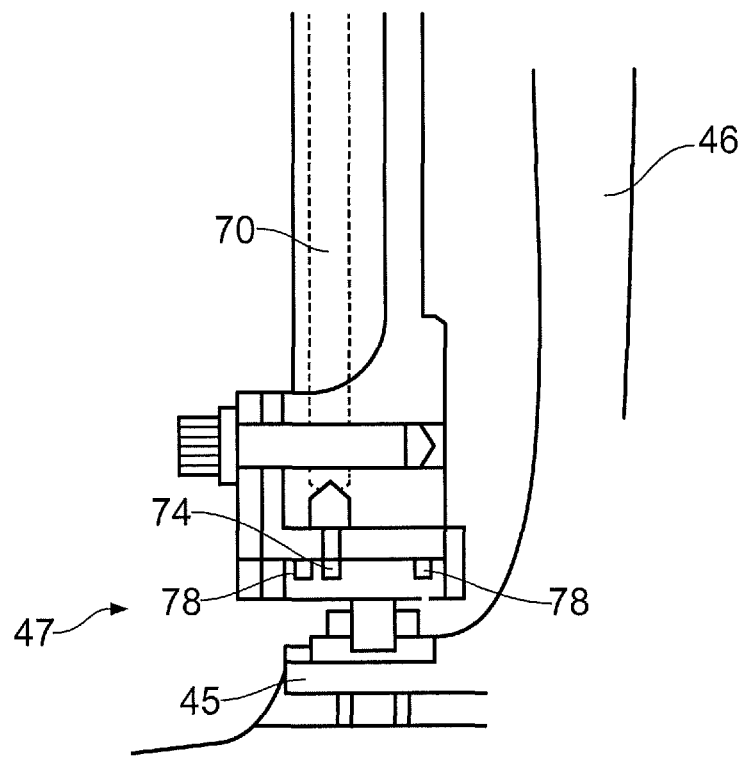
FIG. 2 depicts in more detail the forward carrier roller bearing of FIG. 1.
Figure 3:
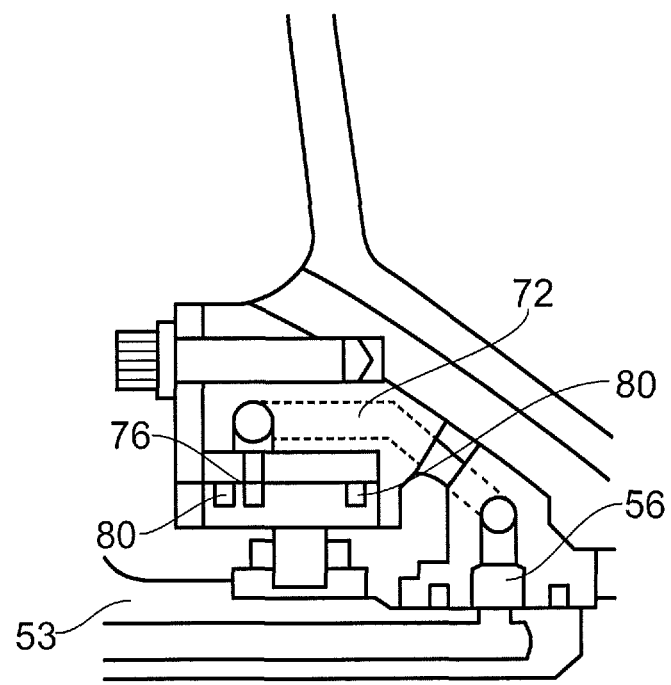
FIG. 3 depicts in more detail the rearward carrier roller bearing of FIG. 1.

To inhibit this unbalance being transmitted directly to the engine structure and engine vibration being transferred to the gearbox squeeze film dampers are introduced to the carrier support bearings. The squeeze film damper for the forward carrier, shown in FIG. 2, and the squeeze film damper for the rearward carrier, shown in FIG. 3 work in fundamentally the same manner.

In the embodiment shown the forward carrier plate has a forwardly extending flange in the shape of a cylinder 45 that extends around the axis of the gear box. The cylinder has a radially outer surface that is located in a fixed axial and radial location by the bearing structure 47.

A conduit 70 supplies lubricant, typically oil, from the engine oil system to a small pressurised, oil filled cavity 74 in the outer race of the carrier support roller bearings. The oil is contained in the cavity by seals that are located in grooves 78 on the bearing outer race outer circumference and which permit a certain magnitude of leakage to ensure that the damper oil temperature is kept at acceptable limits.

The oil filled cavity helps to absorb vibrational energy and isolate the engine structure from the carrier vibrational loads and the carrier from the engine structure vibrational loads.

In the embodiment shown the rearward carrier plate has a rearwardly extending flange in the shape of a cylinder that extends around the axis of the gear box. The cylinder has a radially outer surface that is located in a fixed axial and radial location by the bearing structure.

A conduit 72 supplies lubricant, typically oil, from the engine oil system to a small pressurised, oil filled cavity 76 in the outer race of the carrier support roller bearings. The oil is contained in the cavity by seals that are located in grooves 80 on the bearing outer race outer circumference and which permit a certain magnitude of leakage to ensure that the damper oil temperature is kept at acceptable limits.

The oil filled cavity helps to absorb vibrational energy and isolate the engine structure from the carrier vibrational loads and the carrier from the engine structure vibrational loads.

With appropriate sizing of the oil transfer coupling 56 and the squeeze film damper conduit 72 both the conduit and the coupling can be fed with lubricant from the same source.

Figure 4:
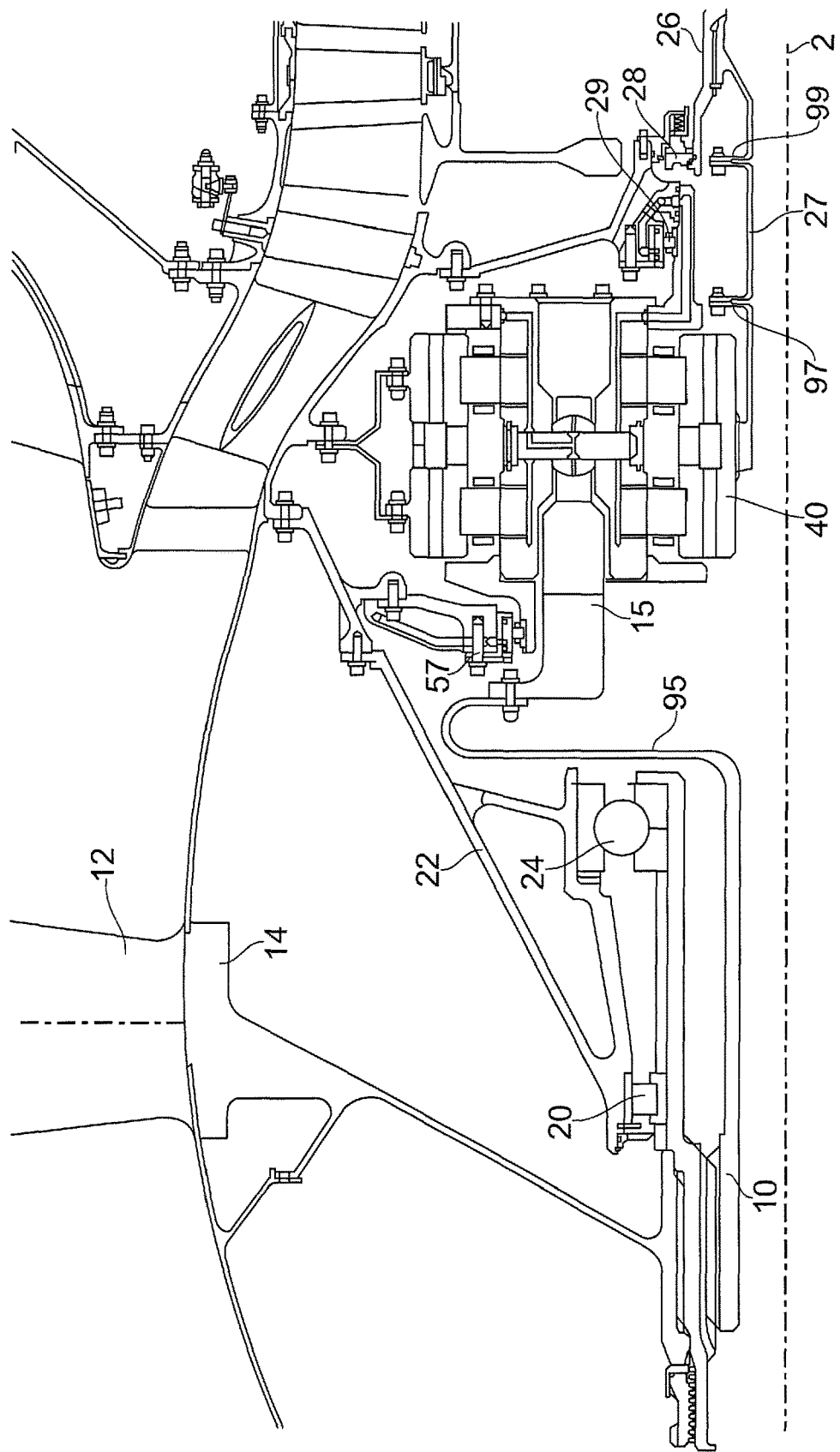
FIG. 4 depicts an alternative cross-section through the front end of a gas turbine engine having a gear architecture 10 in accordance with the present invention for use in a gas turbine engine.

Squeeze film dampers may be located in a number of different locations on the planet carriers. In the arrangement shown in FIG. 4 a squeeze film damper 57 is shown on the radial outer edges of the front planetary carrier along with one 29 on the rearward projection from the rearward carrier. It should be understood that in some embodiments one or more of these dampers may be removed from the architecture.

To limit the fan bending moments generated under flight and failure conditions being reacted on the fan reduction gearbox from being transferred to the gearbox and therefore being reacted by the gearbox a flexible coupling feature 95 that is axially compliant but torsionally stiff is introduced between the fan shaft and the carrier. This feature is connected to the planet carrier close to the planet carrier bearings to react any fan induced loads to the engine casing rather than through the gearbox.

In the arrangement shown the flexible coupling feature is a hollow ring defining a cavity open at its inner periphery and with a continuous wall extending along a first side, around the radially outer end and along a second side to the inner periphery. Both the first and second side walls are substantially parallel but joined at their radially outer end by a curved region. The flexible coupling feature may be symmetrical around the gearbox axis and also symmetrical about a plane that bisects the radially outer end and the inner periphery.

The fan is connected to the output side of the gearbox. If there is no flexibility in the fan drive shaft, fan bending moments under all flight and failure conditions will be reacted on the fan reduction gearbox increasing the loads on the gear teeth and bearings. This will require that the respective components need to be sized accordingly to accommodate the additional loads.

The planet carrier drive pins 15 on which the planet gears with integrated planet bearings are mounted is provided with spherical joints 43 between the pin and the bearings. The spherical joints can compensate for deflection or deviation of the pins to help ensure that the planet gears remain aligned in the plane of the meshing gears. A bearing location pin 41 helps to locate the spherical joint within the gearing arrangement.

To minimise the engine bending moments being transferred to the gearbox and therefore being reacted by the gearbox the power of the low pressure turbine shaft is transferred by a flexible shaft 27 that helps to ensure that any eccentricity between the turbine shafts and the sun gear is accommodated without excessive misalignment in the shaft to sun gear spline connection. This allows the sun gear to find its natural position during operation. The spline interface between the flexible shaft and the sun gear is aligned axially to the gear centre to avoid torsional wind up or unequal moments across the width of the gear thereby maximising meshing and loading conditions. Flexibility is helped by forming the shaft 27 in multiple sections joined at flanges 97, 99.

The gearbox arrangement assists in the equal sharing of load between the planets and the respective gear banks of the double helical gears despite manufacturing tolerances, thermal and load deformation as well as external load inputs from the engine causes uneven loading and misalignment of the gear meshes.

It will be appreciated that the gearbox arrangement allows a gearbox that is of reduced size and lighter than conventional gearboxes as the flexibility helps to minimise loading variations which would otherwise have to be compensated for by providing increased component size. This has the additional effect of efficient use of installation space and a reduced fuel burn due, in part, to the lower weight. Lower weight also has a beneficial impact the sizing of the engine mount structural parts.

Further benefits may be increased gearbox reliability as isolation will limit the number of unknown and magnitude of load cases the gearbox components will be exposed to, an opportunity for optimal gas path definition, minimum tooth profile correction, reduced engine vibration.

The planet carrier support roller bearings can direct gyroscopic loads into the bearing structure and prevent additional gear mesh and bearing loads. Reduced leakage from oil transfer coupling can minimise oil supply to gearbox resulting in reduced heat to oil and oil cooling capacity requirements.

It will be understood that the invention is not limited to the embodiments above-described and various modifications and improvements can be made without departing from the various concepts described herein. Except where mutually exclusive, any of the features may be employed separately or in combination with any other features and the invention extends to and includes all combinations and sub-combinations of one or more features described herein in any form.

The invention claimed is:

1. A geared architecture for a gas turbine, the geared architecture comprising:
   an output shaft connected to a fan;
   an input shaft; and
   a gearbox connecting the input shaft with the output shaft, the gearbox including:
      a forward carrier supported by a forward bearing structure, the forward bearing structure being axially and radially fixed relative to a central axis of the gas turbine, the forward bearing structure axially and radially fixing the forward carrier; and
      a rearward carrier supported by a rearward bearing structure, the rearward bearing structure being axially and radially fixed relative to the central axis of the gas turbine, the rearward bearing structure axially and radially fixing the rearward carrier, wherein:
      at least one of the forward bearing structure and the rearward bearing structure includes a squeeze film damper; and
      a flexible coupling is coupled to the output shaft and the forward carrier.

2. The geared architecture according to claim 1, wherein each bearing structure has a radially outer bearing race, the squeeze film damper being located between a gearbox support arm and the radially outer bearing race.

3. The geared architecture according to claim 2, wherein each squeeze film damper includes a cavity filled with lubricant.

4. The geared architecture according to claim 3, wherein the cavity is connected with a conduit in the gearbox support arm and bounded at axially spaced locations by seals permitting a controlled leakage of lubricant.

5. The geared architecture according to claim 2, wherein the gearbox is an epicyclic gearbox having a central sun gear and a plurality of planet gears adapted to orbit the sun gear.

6. The geared architecture according to claim 5, wherein the forward carrier includes a plurality of planet pins extending into the gearbox, each planet pin supporting a planet gear.

7. The geared architecture according to claim 6, wherein each planet gear is supported on a respective planet pin by a spherical joint permitting relative movement of the planet pin and planet gear.

8. The geared architecture according to claim 2, wherein the forward carrier includes a forward extending flange, the flange having a radially outer surface supported by the forward bearing structure.

9. The geared architecture according to claim 1, wherein the rearward bearing structure has a lubricant transfer coupling configured to supply lubricant to the gearbox.

10. The geared architecture according to claim 9, wherein the rearward carrier has an internal passage configured to supply lubricant from the lubricant transfer coupling to the gearbox.

11. The geared architecture according to claim 10, wherein the internal passage has an inlet adjacent to the lubricant transfer coupling and one or more outlets adjacent to one or more gears in the gearbox.

12. The geared architecture according to claim 1, wherein the gearbox includes a radially outer ring gear flexibly mounted to a fixed structure.

13. The geared architecture according to claim 12, wherein the ring gear has two axially spaced gear regions separated by a non-geared region, and each gear region is separately mounted to the fixed structure by respective flexible mounts.

14. The geared architecture according to claim 13, wherein the separate flexible mounts attach to the fixed structure at a common location point.

15. The geared architecture according to claim 14, wherein a first one of the flexible mounts extends axially forward from the common location point to a respective gear region and a second one of the flexible mounts extends axially rearward from the common location point to a respective gear region.

16. A gas turbine engine comprising:
   a geared architecture, the geared architecture including:
      an output shaft connected to a fan;
      an input shaft; and
      a gearbox connecting the input shaft with the output shaft, the gearbox including:
         a forward carrier supported by a forward bearing structure, the forward bearing structure being axially and radially fixed relative to a central axis of the gas turbine, the forward bearing structure axially and radially fixing the forward carrier; and
         a rearward carrier supported by a rearward bearing structure, the rearward bearing structure being axially and radially fixed relative to the central axis of the gas turbine, the rearward bearing structure axially and radially fixing the rearward carrier, wherein:
      at least one of the forward bearing structure and the rearward bearing structure includes a squeeze film damper; and
      a flexible coupling is coupled to the output shaft and the forward carrier.

* * * * *